(12) United States Patent
Hikichi et al.

(10) Patent No.: US 9,863,280 B2
(45) Date of Patent: Jan. 9, 2018

(54) COMBINED HEAT AND POWER SYSTEM

(71) Applicant: Panasonic Intellectual Property Management Co., Ltd., Osaka-shi, Osaka (JP)

(72) Inventors: Takumi Hikichi, Osaka (JP); Osao Kido, Kyoto (JP); Atsuo Okaichi, Osaka (JP); Osamu Kosuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 14/886,997

(22) Filed: Oct. 19, 2015

(65) Prior Publication Data
US 2016/0040556 A1 Feb. 11, 2016

Related U.S. Application Data

(63) Continuation of application No. PCT/JP2014/002107, filed on Apr. 14, 2014.

(30) Foreign Application Priority Data

Apr. 22, 2013 (JP) .................................. 2013-089215

(51) Int. Cl.
*F01K 3/20* (2006.01)
*F22B 21/24* (2006.01)
(Continued)

(52) U.S. Cl.
CPC .............. *F01K 3/205* (2013.01); *F01K 9/003* (2013.01); *F01K 25/08* (2013.01); *F22B 1/18* (2013.01);
(Continued)

(58) Field of Classification Search
CPC .......... F01K 3/205; F01K 9/003; F01K 25/08; F24H 1/145; F22B 21/24; F22B 21/26; F22B 37/101; F22B 1/18; Y02E 20/14
(Continued)

(56) References Cited

U.S. PATENT DOCUMENTS 3,127,744 A * 4/1964 Nettel ................... F01K 23/103
60/39.182
4,468,923 A * 9/1984 Jorzyk ................... F01K 23/061
60/39.182
(Continued)

FOREIGN PATENT DOCUMENTS

EP  2 014 880   1/2009
JP  2-301606   12/1990
(Continued)

OTHER PUBLICATIONS

Extended European Search Report issued in corresponding European Patent Application No. 14787471.3, dated Mar. 17, 2016, 5 pages.

*Primary Examiner* — Hoang Nguyen
(74) *Attorney, Agent, or Firm* — Hamre, Schumann, Mueller & Larson, P.C.

(57) ABSTRACT

A CHP system includes a combustor (heat source), a Rankine cycle apparatus, and a second heat exchanger. The Rankine cycle apparatus includes, as an evaporator, a first heat exchanger that absorbs thermal energy produced in the combustor. The second heat exchanger is located closer to the combustor than is the evaporator, absorbs thermal energy produced in the combustor, and transfers the thermal energy to a heat medium.

16 Claims, 11 Drawing Sheets

(51) Int. Cl.
*F24H 1/14* (2006.01)
*F22B 1/18* (2006.01)
*F01K 25/08* (2006.01)
*F22B 37/10* (2006.01)
*F22B 21/26* (2006.01)
*F01K 9/00* (2006.01)

(52) U.S. Cl.
CPC ............. *F22B 21/24* (2013.01); *F22B 21/26* (2013.01); *F22B 37/101* (2013.01); *F24H 1/145* (2013.01); *Y02E 20/14* (2013.01)

(58) Field of Classification Search
USPC .............................. 60/39.182, 651, 671, 655
See application file for complete search history.

(56) References Cited

U.S. PATENT DOCUMENTS

| | | | | |
|---|---|---|---|---|
| 4,479,355 A | * | 10/1984 | Guide | ................... F01K 23/06 60/655 |
| 4,628,462 A | * | 12/1986 | Putman | ................... F01K 17/02 60/660 |
| 6,223,523 B1 | * | 5/2001 | Frutschi | ................ F01K 21/042 60/39.182 |
| 2007/0007771 A1 | * | 1/2007 | Biddle | ................ B01D 53/002 290/7 |
| 2015/0075133 A1 | | 3/2015 | Tanimura et al. | |
| 2015/0267569 A1 | * | 9/2015 | Hikichi | .................... F22B 1/18 60/671 |

FOREIGN PATENT DOCUMENTS

| | | |
|---|---|---|
| JP | 7-025554 Y2 | 6/1995 |
| JP | 2001-520360 | 10/2001 |
| JP | 2002-161716 | 6/2002 |
| JP | 2002-536587 | 10/2002 |
| JP | 2005-315492 | 11/2005 |
| JP | 2006-322692 | 11/2006 |
| JP | 2007-046469 | 2/2007 |
| JP | 2007/255363 | 10/2007 |
| JP | 4296200 B | 7/2009 |
| WO | 99/19667 | 4/1999 |
| WO | 00/47874 | 8/2000 |
| WO | 2005031123 | 9/2004 |
| WO | 2013/151029 | 10/2013 |
| WO | 2014/087639 | 6/2014 |

* cited by examiner

COMBINED HEAT AND POWER SYSTEM

This is a continuation of International Application No. PCT/JP2014/002107, with an international filing date of Apr. 14, 2014, which claims the foreign priority of Japanese Patent Application No. 2013-089215, filed on Apr. 22, 2013, the entire contents of both of which are hereby incorporated by reference.

BACKGROUND OF THE INVENTION

1. Field of the Invention

The present disclosure relates to combined heat and power systems.

2. Description of Related Art

A combined heat and power system (CHP system) is a system configured to create several forms of energy such as heat and electricity simultaneously from a single or plurality of sources. In recent years, not only large-scale CHP systems but also CHP systems installable in relatively small-scale facilities such as hospitals, schools, and libraries and CHP systems for use in ordinary houses (so-called micro CHPs) have been receiving attention.

EP 2014880 A1 describes a CHP system configured to create electricity using combustion gas produced in a gas boiler or a pellet boiler as thermal energy for a Rankine cycle apparatus. In the CHP system of EP 2014880 A1, an evaporator of the Rankine cycle apparatus is located closer to a heat source than is a heat exchanger for producing hot water; that is, the evaporator is located on the upstream side of a flow path of the combustion gas. With this configuration, thermal input to the evaporator is increased, and the rotary power of an expander of the Rankine cycle apparatus is increased, in consequence of which increased electricity is obtained.

SUMMARY OF THE INVENTION

Conventional CHP systems have a problem in that when the operation of the Rankine cycle apparatus ceases due to defects, including failure of devices such as the expander and the pump and leakage of the working fluid, the entire system is forced to stop operation.

One non-limiting and exemplary embodiment provides a CHP system capable of supplying thermal energy even when the operation of its Rankine cycle apparatus is stopped.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a combined heat and power system including: a heat source; a Rankine cycle apparatus including, as an evaporator for heating a working fluid, a first heat exchanger that absorbs thermal energy produced in the heat source; and a second heat exchanger that is a heat exchanger for heating a heat medium different from the working fluid of the Rankine cycle apparatus, that is located closer to the heat source than is the first heat exchanger, and that absorbs thermal energy produced in the heat source and transfers the thermal energy to the heat medium.

The above CHP system can supply thermal energy even when the operation of the Rankine cycle apparatus is stopped.

These general and specific aspects may be implemented using a system, a method, a computer program, and any combination of systems, methods, and computer programs.

DETAILED DESCRIPTION

Figure 1:
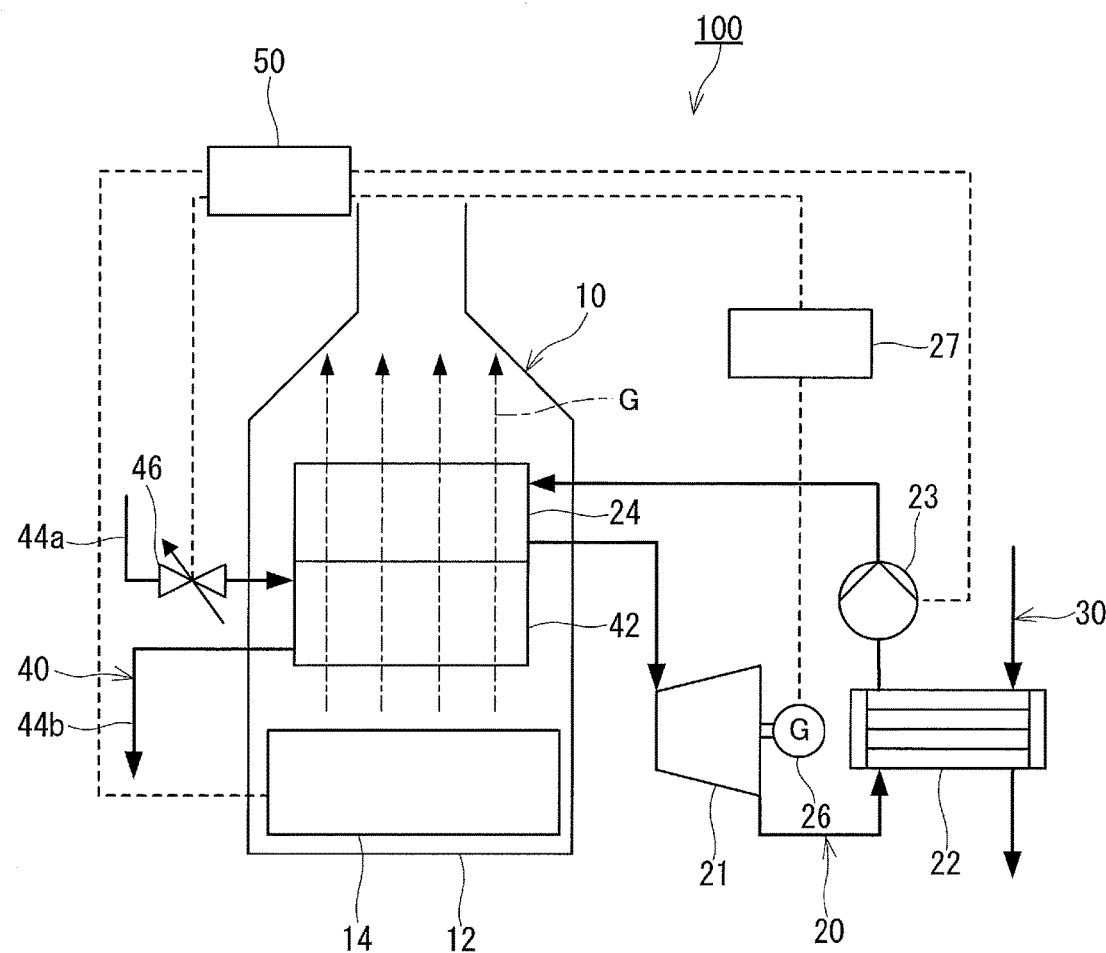
FIG. 1 is a configuration diagram of a combined heat and power system according to an embodiment of the present disclosure.

The CHP system described in EP 2014880 A1 is seemingly capable of producing hot water even when the operation of the Rankine cycle apparatus is stopped. However, continuously combusting the fuel in the boiler may cause defects such as thermal damage to the evaporator of the Rankine cycle apparatus, thermal decomposition of the working fluid, and thermal decomposition of the lubricating oil. In the case of the conventional CHP system, therefore, the entire system needs to be shutdown when the operation of the Rankine cycle apparatus is stopped.

A first aspect of the present disclosure provides a combined heat and power system including: a heat source; a Rankine cycle apparatus including, as an evaporator for heating a working fluid, a first heat exchanger that absorbs thermal energy produced in the heat source; and a second heat exchanger that is a heat exchanger for heating a heat medium different from the working fluid of the Rankine cycle apparatus, that is located closer to the heat source than is the first heat exchanger, and that absorbs thermal energy produced in the heat source and transfers the thermal energy to the heat medium.

In the CHP system of the first aspect, the evaporator (first heat exchanger) of the Rankine cycle apparatus is located farther from the heat source than is the second heat exchanger, which is why the temperature of the medium (e.g., the combustion gas) that imparts thermal energy to the evaporator can be lowered. Consequently, even when the operation of the Rankine cycle apparatus is stopped, it is possible to heat the heat medium in the second heat exchanger while preventing defects such as thermal damage to the evaporator and thermal decomposition of the working fluid of the Rankine cycle apparatus.

A second aspect of the present disclosure provides the combined heat and power system as set forth in the first aspect, wherein the second heat exchanger is in direct contact with the first heat exchanger or in indirect contact with the first heat exchanger via a thermally-conductive member. With such a configuration, the heat of the evaporator (first heat exchanger) of the Rankine cycle apparatus is transferred to the second heat exchanger since the second heat exchanger is in direct contact with the evaporator or in indirect contact with the evaporator via the thermally-conductive member. Consequently, even when the operation of the Rankine cycle apparatus is stopped, it is possible to efficiently heat the heat medium in the second heat exchanger while preventing defects such as thermal damage to the evaporator and thermal decomposition of the working fluid of the Rankine cycle apparatus.

A third aspect of the present disclosure provides the combined heat and power system as set forth in the first or second aspect, wherein the heat source is a combustor that produces flame and combustion gas. With the use of the combustor that produces flame and combustion gas as the heat source, high-temperature thermal energy can easily be obtained. This can result in an improvement in the efficiency of electricity generation by the Rankine cycle apparatus. Furthermore, the sizes of the first heat exchanger and the second heat exchanger can be reduced.

A fourth aspect of the present disclosure provides the combined heat and power system as set forth in the third aspect, wherein the first heat exchanger and the second heat exchanger are disposed on an exhaust path of the combustion gas so that the combustion gas passes through the second heat exchanger and the first heat exchanger in this order. With such a configuration, the first heat exchanger and the second heat exchanger can absorb thermal energy directly from the combustion gas. Therefore, both the energy of the flame and the energy of the combustion gas are efficiently absorbed in the first heat exchanger and the second heat exchanger, and hence high energy use efficiency can be achieved.

A fifth aspect of the present disclosure provides the combined heat and power system as set forth in any one of the first to fourth aspects, further including: a flow path connected to the second heat exchanger so as to feed the heat medium to the second heat exchanger; and a flow rate regulator disposed in the flow path. By control of the flow rate regulator, the amount of the heat medium flowing through the second heat exchanger can be regulated. That is, it is possible not only to regulate the amount of the heat medium to be heated on demand, but also to adjust the ratio of the thermal output (kWt) to the electrical output (kWe) to an optimum range.

A sixth aspect of the present disclosure provides the combined heat and power system as set forth in the fifth aspect, wherein the Rankine cycle apparatus includes a detector that detects an amount of generated electricity, and the combined heat and power system further includes a controller that controls the flow rate regulator based on the amount of generated electricity detected by the detector. With such a configuration, the electrical output and the thermal output can be freely and finely adjusted on demand.

A seventh aspect of the present disclosure provides the combined heat and power system as set forth in any one of the first to sixth aspects, wherein the combined heat and power system is capable of heating the heat medium by feeding the heat medium to the second heat exchanger when the Rankine cycle apparatus is not generating electricity. With such a configuration, it is possible to heat the heat medium in the second heat exchanger while preventing defects such as thermal damage to the first heat exchanger and thermal decomposition of the working fluid, thereby improving the convenience for users.

An eighth aspect of the present disclosure provides the combined heat and power system as set forth in the third or fourth aspect, wherein the combustor includes a plurality of discrete combustors capable of producing the flame and the combustion gas independently of each other, and a positional relationship between the second heat exchanger and the plurality of discrete combustors is determined so that the combustion gas produced in at least one of the discrete combustors flows without passing through the second heat exchanger. With such a configuration, the combustion gas can be delivered directly to the first heat exchanger and, therefore, the temperature of the combustion gas reaching the first heat exchanger can be made high. Thus, the amount of heat imparted to the first heat exchanger can be increased. Consequently, the amount of electricity generated by the Rankine cycle apparatus can be increased and, at the same time, the efficiency of electricity generation can be improved.

A ninth aspect of the present disclosure provides the combined heat and power system as set forth in any one of the first to eighth aspects, further including a third heat exchanger located farther from the heat source than is the first heat exchanger, wherein the third heat exchanger transfers thermal energy produced in the heat source to the heat medium. With the use of the third heat exchanger, that remaining portion of the thermal energy produced in the heat source which has not been absorbed in the first heat exchanger and the second heat exchanger can be recovered. Consequently, the efficiency of use of the thermal energy produced in the heat source is improved.

A tenth aspect of the present disclosure provides the combined heat and power system as set forth in the ninth aspect, wherein the third heat exchanger is connected to the second heat exchanger so that the heat medium having passed through the third heat exchanger flows into the second heat exchanger. With such a configuration, water with a relatively low temperature flows through the third heat exchanger, while water with a relatively high temperature flows through the second heat exchanger. Hence, a larger amount of thermal energy can be absorbed in the second heat exchanger and the third heat exchanger. Consequently, the efficiency of use of the thermal energy produced in the heat source is improved.

An eleventh aspect of the present disclosure provides the combined heat and power system as set forth in the second aspect, wherein the thermally-conductive member is a heat pipe that allows the first heat exchanger and the second heat exchanger to be in indirect contact with each other. With the use of the heat pipe, heat transfer from the first heat exchanger to the second heat exchanger can be facilitated.

Hereinafter, embodiments of the present disclosure will be described with reference to the drawings. It should be noted that the present disclosure is not limited by the embodiments described hereinafter.

As shown in FIG. 1, a combined heat and power system 100 (hereinafter referred to as a "CHP system") of the present embodiment includes a boiler 10, a Rankine cycle apparatus 20, a first fluid circuit 30, a second fluid circuit 40, and a controller 50. The CHP system 100 is configured to create hot water and electricity simultaneously or separately using thermal energy produced in the boiler 10. The word "simultaneously" is used to mean that electricity can be supplied while hot water is supplied. The word "separately" is used to mean that electricity alone can be supplied while supply of hot water is stopped, and hot water alone can be supplied while supply of electricity is stopped.

When the Rankine cycle apparatus 20 is in operation, electricity produced in the Rankine cycle apparatus 20, hot water produced in the first fluid circuit 30, and hot water produced in the second fluid circuit 40 can be supplied to the outside. When the Rankine cycle apparatus 20 is not in operation, hot water produced in the second fluid circuit 40 can be supplied to the outside.

In the present embodiment, the heat medium flowing in the first fluid circuit 30 is water. However, the heat medium to be heated in the first fluid circuit 30 is not limited to water. The first fluid circuit 30 may be configured to heat another heat medium such as brine and air. In the present embodiment, the heat medium flowing in the second fluid circuit 40 is also water. The heat medium to be heated in the second fluid circuit 40 is not limited to water either. The second fluid circuit 40 may be configured to heat another liquid heat medium such as brine.

The boiler 10 includes a combustion chamber 12 and a combustor 14. An exhaust port is provided at the top of the combustion chamber 12. The combustor 14 is a heat source that produces flame and combustion gas, and is disposed inside the combustion chamber 12. The combustion gas produced in the combustor 14 moves upwardly in the internal space of the combustion chamber 12, and is discharged outside through the exhaust port. With the use of the combustor 14 that produces flame and combustion gas as the heat source in the CHP system 100, high-temperature thermal energy can easily be obtained. Consequently, the efficiency of electricity generation by the Rankine cycle apparatus 20 can be improved. Another device such as an air blower may be disposed inside the boiler 10.

The boiler 10 is, for example, a gas boiler. When the boiler 10 is a gas boiler, a fuel gas such as natural gas and biogas is supplied to the combustor 14. The combustor 14 produces flame and high-temperature combustion gas by combusting the fuel gas.

The Rankine cycle apparatus 20 includes an expander 21, a condenser 22, a pump 23, and an evaporator 24. These components are connected circularly by a plurality of pipes in the order in which they are mentioned, so that a closed circuit is formed. The Rankine cycle apparatus 20 may be provided with a commonly-known regenerator or the like.

The expander 21 expands the working fluid heated in the boiler 10. The expander 21 is, for example, a positive-displacement expander or a turbo-expander. Examples of the positive-displacement expander include scroll expanders, rotary expanders, screw expanders, and reciprocating expanders. The turbo-expander is a so-called expansion turbine. An electricity generator 26 is connected to the rotating shaft of the expander 21. The electricity generator 26 is driven by the expander 21. The Rankine cycle apparatus 20 is provided with a detector 27 that detects the amount of electricity (kWe) generated by the electricity generator 26. The detector 27 is typically a wattmeter. The information on the amount of electricity detected by the detector 27 is transmitted to the controller 50.

The condenser 22 allows heat exchange to take place between water in the first fluid circuit 30 and the working fluid discharged from the expander 21, thereby cooling the working fluid and heating the water. A commonly-known heat exchanger, such as a plate heat exchanger, a double tube heat exchanger, and a fin tube heat exchanger, can be used as the condenser 22. The type of the condenser 22 is selected as appropriate depending on the type of the heat medium in the first fluid circuit 30. When the heat medium in the first fluid circuit 30 is a liquid such as water, a plate heat exchanger or a double tube heat exchanger can be suitably used as the condenser 22. When the heat medium in the first fluid circuit 30 is a gas such as air, a fin tube heat exchanger can be suitably used as the condenser 22.

The pump 23 draws the working fluid flowing from the condenser 22, pressurizes the working fluid, and delivers the pressurized working fluid to the evaporator 24. A common positive-displacement pump or turbo-pump can be used as the pump 23. Examples of the positive-displacement pump include piston pumps, gear pumps, vane pumps, and rotary pumps. Examples of the turbo-pump include centrifugal pumps, mixed flow pumps, and axial-flow pumps.

Figure 2:
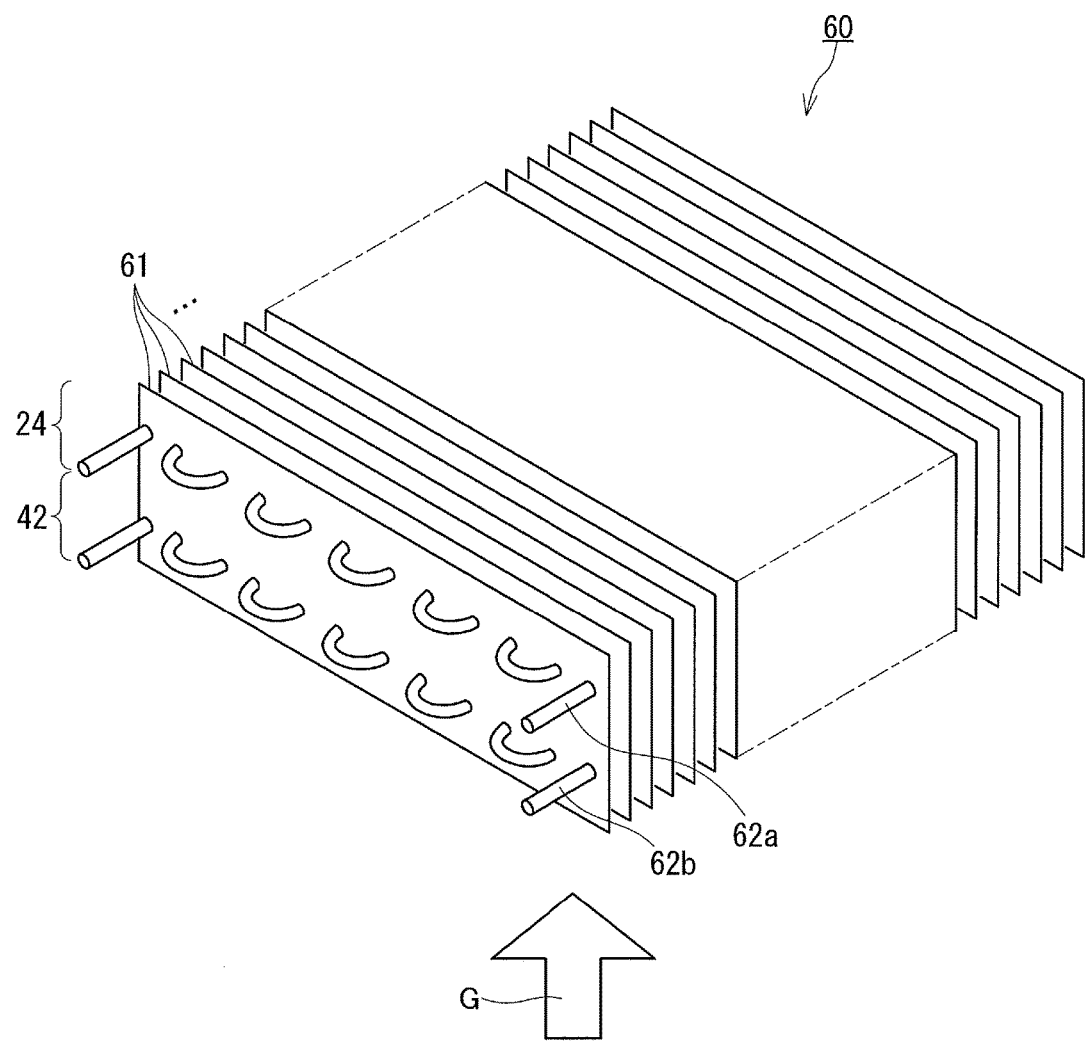
FIG. 2 is a perspective view of a heat exchange unit.

The evaporator 24 is a first heat exchanger that absorbs thermal energy from the combustion gas produced in the combustor 14. Specifically, the evaporator 24 is disposed inside the boiler 10 so as to be located relatively far from the combustor 14. A fin tube heat exchanger, as shown in FIG. 2, can be used as the evaporator 24. The combustion gas produced in the combustor 14 and the working fluid of the Rankine cycle apparatus 20 exchange heat in the evaporator 24. Thus, the working fluid of the Rankine cycle apparatus 20 is heated and evaporated. Not only the heat of the combustion gas but also the radiant heat from the flame is applied to the evaporator 24.

An organic working fluid can be suitably used as the working fluid of the Rankine cycle apparatus 20. Examples of the organic working fluid include halogenated hydrocarbons, hydrocarbons, and alcohols. Examples of the halogenated hydrocarbons include R-123 and R-245fa. Examples of the hydrocarbons include alkanes such as propane, butane, pentane, and isopentane. Examples of the alcohols include ethanol. These organic working fluids may be used alone, or a mixture of two or more thereof may be used. Also, there may be some cases where an inorganic working fluid such as water, carbon dioxide, and ammonia can be used as the working fluid.

The first fluid circuit 30 is connected to the condenser 22 of the Rankine cycle apparatus 20 so as to feed water to the condenser 22. The water in the first fluid circuit 30 is heated by the working fluid discharged from the expander 21.

When the heat medium to be heated through the first fluid circuit 30 is a liquid such as water, the first fluid circuit 30 can be formed by one or more pipes. When the heat medium to be heated through the first fluid circuit 30 is a gas such as air, the first fluid circuit 30 can be formed by an air path or a duct for the flow of the gas.

The second fluid circuit 40 has a second heat exchanger 42, a flow path 44a, a flow path 44b, and a flow rate regulator 46. The second heat exchanger 42 is disposed inside the boiler 10 so as to be located closer to the combustor 14 than is the evaporator 24 of the Rankine cycle apparatus 20 and to be in contact with the evaporator 24. The second heat exchanger 42 absorbs thermal energy from the combustion gas produced in the combustor 14 and transfers the thermal energy to water (heat medium). That is, the combustion gas produced in the combustor 14 and water in the second fluid circuit 40 exchange heat in the second heat exchanger 42. Thus, the water in the second fluid circuit 40 is heated. The radiant heat from the flame produced in the combustor 14 is also applied to the second heat exchanger 42. The second heat exchanger 42 may be heated directly by the flame produced in the combustor 14 in some cases.

The first fluid circuit 30 and the second fluid circuit 40 are each a circuit provided independently of the working fluid circuit of the Rankine cycle apparatus 20. This means that the fluid flowing in the first fluid circuit 30 and the working fluid of the Rankine cycle apparatus 20 are never mixed together, and that the fluid flowing in the second fluid circuit 40 and the working fluid of the Rankine cycle apparatus 20 are never mixed together. The second heat exchanger 42 is a heat exchanger for heating a heat medium (water in the present embodiment) different from the working fluid of the Rankine cycle apparatus 20.

A fin tube heat exchanger, as shown in FIG. 2, can be used as the second heat exchanger 42. The flow paths 44a and 44b are connected to the second heat exchanger 42 so as to feed water to the second heat exchanger 42. The flow paths 44a and 44b can each be formed by one or more pipes. The flow rate regulator 46 is disposed in the flow path 44a. The flow rate regulator 46 is typically a flow rate regulating valve. By controlling the flow rate regulator 46, the amount of water flowing through the second heat exchanger 42 can be regulated. That is, it is possible not only to regulate the amount of hot water to be produced on the demand for hot water (heat) but also to adjust the ratio (heat-to-power ratio) of the thermal output (kWt) to the electrical output (kWe) to an optimum range.

The heat-to-power ratio can be adjusted also by designing the evaporator 24 and the second heat exchanger 42 appropriately. For example, the evaporator 24 may have relatively high capacity, while the second heat exchanger 42 may have relatively low capacity. Specifically, in the example shown in FIG. 2, the dimension of the evaporator 24 in the height direction (the flow direction of the combustion gas) can be set large, and the dimension of the second heat exchanger 42 in the height direction can be set small. More specifically, the number of rows of heat transfer tubes 62a of the evaporator 24 in the height direction can be set relatively large, and the number of rows of heat transfer tubes 62b of the second heat exchanger 42 in the height direction can be set relatively small. With such a configuration, the Rankine cycle apparatus 20 can be endowed with sufficient capacity to generate electricity.

Conversely, the evaporator 24 may have relatively low capacity, while the second heat exchanger 42 may have relatively high capacity. Specifically, in the example shown in FIG. 2, the dimension of the evaporator 24 in the height direction can be set small, and the dimension of the second heat exchanger 42 in the height direction can be set large. More specifically, the number of rows of the heat transfer tubes 62a of the evaporator 24 in the height direction can be set relatively small, and the number of rows of the heat transfer tubes 62b of the second heat exchanger 42 in the height direction can be set relatively large. With such a configuration, the second heat exchanger 42 can be endowed with sufficient capacity to supply hot water.

The controller 50 controls various targets such as the pump 23 of the Rankine cycle apparatus 20, the combustor 14 of the boiler 10, and the flow rate regulator 46 of the second fluid circuit 40. A DSP (Digital Signal Processor) including an A/D conversion circuit, an input/output circuit, a computing circuit, a memory device, etc., can be used as the controller 50. In the controller 50, there is stored a program for operating the CHP system 100 properly.

The hot water produced in the first fluid circuit 30 can be supplied to equipment such as faucets, hot water heater circuits, and hot water storage tanks. The first fluid circuit 30 may be used to heat lukewarm water or may be used to heat city water. The same applies to the second fluid circuit 40.

In the present embodiment, the second heat exchanger 42 of the second fluid circuit 40 is located closer to the combustor 14 than is the evaporator 24 of the Rankine cycle apparatus 20. Therefore, the second heat exchanger 42 is exposed to an atmosphere of relatively high temperature, and can absorb a large amount of thermal energy. Hence, the second fluid circuit 40 has high capacity to supply hot water. Additionally, that remaining portion of the thermal energy produced in the combustor 14 which has not been absorbed in the second heat exchanger 42 is absorbed in the evaporator 24. Specifically, the combustion gas reaching the evaporator 24 is one that has been cooled by the second heat exchanger 42, and has a relatively low temperature. That is, according to the present embodiment, the temperature of the combustion gas flowing into the evaporator 24 can be lowered by feeding water to the second heat exchanger 42 even when the Rankine cycle apparatus 20 is not in operation. Consequently, it is possible to prevent defects such as thermal damage to the evaporator 24, thermal decomposition of the working fluid, thermal decomposition of the lubricating oil, and excessive increase in the internal pressure of the Rankine cycle apparatus 20 due to thermal expansion of the working fluid. At the same time, hot water can be produced by use of the second fluid circuit 40. In other words, the same operation as that of a common hot-water boiler can be carried out in the CHP system 100 even when the Rankine cycle apparatus 20 is not in operation.

The evaporator 24 of the Rankine cycle apparatus 20 and the second heat exchanger 42 of the second fluid circuit 40 are in contact with each other in the boiler 10. Therefore, the thermal energy produced in the combustor 14 can be imparted to the water in the second heat exchanger 42 via the evaporator 24. Hence, even if the evaporator 24 absorbs the thermal energy when the Rankine cycle apparatus 20 is not in operation (when the pump 23 is not in operation), the heat can be transferred from the evaporator 24 to the water in the second heat exchanger 42. Consequently, it is possible to reliably prevent defects such as thermal damage to the evaporator 24, thermal decomposition of the working fluid, thermal decomposition of the lubricating oil, and excessive increase in the internal pressure of the Rankine cycle apparatus 20 due to thermal expansion of the working fluid. Furthermore, an improvement in the efficiency of recovery of the thermal energy can be expected.

As shown in FIG. 2, the evaporator 24 and the second heat exchanger 42 are in direct contact with each other so that heat of the evaporator 24 can be directly transferred to the second heat exchanger 42 via a medium other than air. Specifically, the evaporator 24 and the second heat exchanger 42 are each a fin tube heat exchanger, and the evaporator 24 and the second heat exchanger 42 share a plurality of fins 61. The evaporator 24 is formed of the upper halves of the fins 61 and the heat transfer tube 62a. The second heat exchanger 42 is formed of the lower halves of the fins 61 and the heat transfer tube 62b. The heat transfer tube 62a of the evaporator 24 does not communicate with the heat transfer tube 62b of the second heat exchanger 42. The working fluid flows through the heat transfer tube 62a, and water flows through the heat transfer tube 62b. The heat of the evaporator 24 can be efficiently transferred via the fins 61 to the water flowing in the second heat exchanger 42. Thus, defects such as thermal damage to the evaporator 24, thermal decomposition of the working fluid, and thermal decomposition of the lubricating oil, can be prevented.

In the present embodiment, the evaporator 24 and the second heat exchanger 42 form a single heat exchange unit 60. The heat exchange unit 60 is disposed inside the boiler 10 so as to be located directly above the combustor 14. The fins 61 are aligned in the horizontal direction. The heat transfer tubes 62a and 62b each pierce through the fins 61 in the horizontal direction. The spaces formed between the adjacent fins 61 form an exhaust path of the combustion gas G. In other words, the second heat exchanger 42 and the evaporator 24 are disposed on the exhaust path of the combustion gas G so that the combustion gas G passes through the second heat exchanger 42 and the evaporator 24 in this order. With such a configuration, the second heat exchanger 42 and the evaporator 24 can absorb thermal energy directly from the combustion gas G and, therefore, high energy use efficiency can be achieved.

The structures of the evaporator 24 and the second heat exchanger 42 are not particularly limited, as long as good heat transfer from the evaporator 24 to the second heat exchanger 42 can be achieved. For example, the evaporator 24 and the second heat exchanger 42 may each be formed by a serpentine heat transfer tube. In this case, the heat transfer tubes are in direct contact with each other. That is, it is desirable that a component of the evaporator 24 be in direct contact with a component of the second heat exchanger 42.

In the present embodiment, the second heat exchanger 42 is located relatively close to the combustor 14, while the evaporator 24 is located relatively far from the combustor 14. With this positional relationship, thermal input to the second heat exchanger 42 is increased, which enables an increase in the capacity of the second fluid circuit 40 to supply hot water.

In the present embodiment, even when water is not fed to the second fluid circuit 40, heat can be transferred from the second heat exchanger 42 to the evaporator 24 via the fins 61. Therefore, the amount of heat input to the evaporator 24 can be increased. Additionally, when water is not fed to the second fluid circuit 40, the combustion gas G of higher temperature can be supplied to the evaporator 24. Consequently, an increase in the amount of electricity generated by the Rankine cycle apparatus 20 and an improvement in the efficiency of electricity generation can be expected.

Next, two typical operation modes of the CHP system 100 will be described. The first operation mode is an operation mode used when the Rankine cycle apparatus 20 is in operation. The second operation mode is an operation mode used when the Rankine cycle apparatus 20 is not in operation.

<First Operation Mode>

In the first operation mode, the CHP system 100 can supply both hot water and electricity to the outside. First, the pump 23 is driven to start the operation of the Rankine cycle apparatus 20, and feed of water to the first fluid circuit 30 is started at an appropriate time. Thereafter, supply of a fuel to the combustor 14 is started at an appropriate time, and the fuel is ignited. The working fluid of the Rankine cycle apparatus 20 receives heat from combustion gas in the evaporator 24, and changes to a superheated gaseous form. The high-temperature gaseous working fluid is delivered to the expander 21. In the expander 21, the pressure energy of the working fluid is converted to mechanical energy, so that the electricity generator 26 is driven. Thus, electricity is generated in the electricity generator 26. The working fluid discharged from the expander 21 flows into the condenser 22. The working fluid may maintain the superheated state at the outlet of the expander 21. In the condenser 22, the working fluid is cooled and condensed by water flowing in the first fluid circuit 30. The water in the first fluid circuit 30 is heated by the working fluid. Hot water is produced in the first fluid circuit 30, and the produced hot water is supplied to the outside. The condensed working fluid is pressurized by the pump 23, and is delivered to the evaporator 24 again.

Independently of the operation of the Rankine cycle apparatus 20, feed of water to the second fluid circuit 40 is started at an appropriate time. The water flowing in the second fluid circuit 40 is heated by the combustion gas. Hot water is produced also in the second fluid circuit 40, and the produced hot water is supplied to the outside.

In the first operation mode, the controller 50 controls the pump 23 and/or the flow rate regulator 46 based on the amount of generated electricity detected by the detector 27. Such control makes it possible to freely and finely adjust the electrical output and the thermal output on demand. For example, if a command to increase the electrical output is input to the controller 50 (that is, when the electrical output should be increased), the controller 50 controls the pump 23 so as to increase the circulation rate of the working fluid, and controls the flow rate regulator 46 so as to reduce the flow rate of water in the second fluid circuit 40. Specifically, the controller 50 increases the rotation speed of the pump 23, and reduces the degree of opening of the flow rate regulator 46. Conversely, if a command to reduce the electrical output is input to the controller 50 (that is, when the electrical output should be reduced), the controller 50 controls the pump 23 so as to reduce the circulation rate of the working fluid, and controls the flow rate regulator 46 so as to increase the flow rate of water in the second fluid circuit 40. Specifically, the controller 50 reduces the rotation speed of the pump 23, and increases the degree of opening of the flow rate regulator 46. Both the control of the pump 23 and the control of the flow rate regulator 46 may be carried out, or one of the controls may be carried out alone, depending on the amount of generated electricity detected by the detector 27.

Furthermore, when the controller 50 detects malfunction of the Rankine cycle apparatus 20, the controller 50 controls the flow rate regulator 46 so as to increase the flow rate of water in the second fluid circuit 40. For example, when the controller 50 detects that the amount of generated electricity detected by the detector 27 has become zero, the controller 50 determines that malfunction of the Rankine cycle apparatus 20 has occurred, and controls the flow rate regulator 46. Thus, defects such as thermal damage to the evaporator 24 and excessive increase in the internal pressure of the Rankine cycle apparatus 20 can be prevented even when unexpected failure or the like has occurred in the Rankine cycle apparatus 20. When the boiler 10 is a gas boiler, defects such as thermal damage to the evaporator 24 can be prevented more reliably by stopping the supply of the fuel to the combustor 14. However, when the boiler 10 is a pellet boiler as described later, there is a possibility that the production of the combustion gas cannot be stopped immediately. In such a situation, defects such as thermal damage to the evaporator 24 can be prevented by controlling the flow rate regulator 46 to feed a larger amount of water to the second fluid circuit 40.

When the demand for hot water is low, hot water supply from the second fluid circuit 40 may be stopped. In this case, electricity is supplied from the Rankine cycle apparatus 20, and hot water is supplied from the first fluid circuit 30. Since water is not fed to the second fluid circuit 40, the thermal energy imparted to the evaporator 24 is equal to the total of the thermal energy directly imparted from the combustion gas and the thermal energy indirectly imparted from the second heat exchanger 42 via the fins 61. That is, the evaporator 24 absorbs a larger amount of thermal energy, and the working fluid can be heated to a higher temperature. Consequently, the amount of electricity generated by the Rankine cycle apparatus 20 is increased, and the efficiency of electricity generation is improved while defects such as thermal damage to the second heat exchanger 42 are prevented. The operation thus far described is suitable for a situation where the demand for hot water is low and the demand for electricity is large.

<Second Operation Mode>

In the second operation mode, the Rankine cycle apparatus 20 is not in operation, and the CHP system 100 can supply hot water alone to the outside. The CHP system 100 is capable of heating water by feeding water to the second heat exchanger 42 when the Rankine cycle apparatus 20 is not generating electricity. Specifically, water is fed to the second fluid circuit 40 so that hot water is produced by use of the second fluid circuit 40. The second heat exchanger 42 directly absorbs heat of the combustion gas and, at the same time, indirectly absorbs heat of the combustion gas via the evaporator 24. Thus, it is possible to produce hot water in the second heat exchanger 42 while preventing defects such as thermal damage to the evaporator 24 and thermal decomposition of the working fluid, thereby improving the convenience for users. In the second operation mode, the flow rate regulator 46 is controlled to be fully open, for example.

Hereinafter, several modifications of the CHP system will be described. The elements common between the CHP system 100 shown in FIG. 1 and each modification are denoted by the same reference numerals, and the description thereof is omitted. That is, the matters described for the CHP system 100 can apply to the modifications below unless technical inconsistency occurs.

(First Modification)

Figure 3:
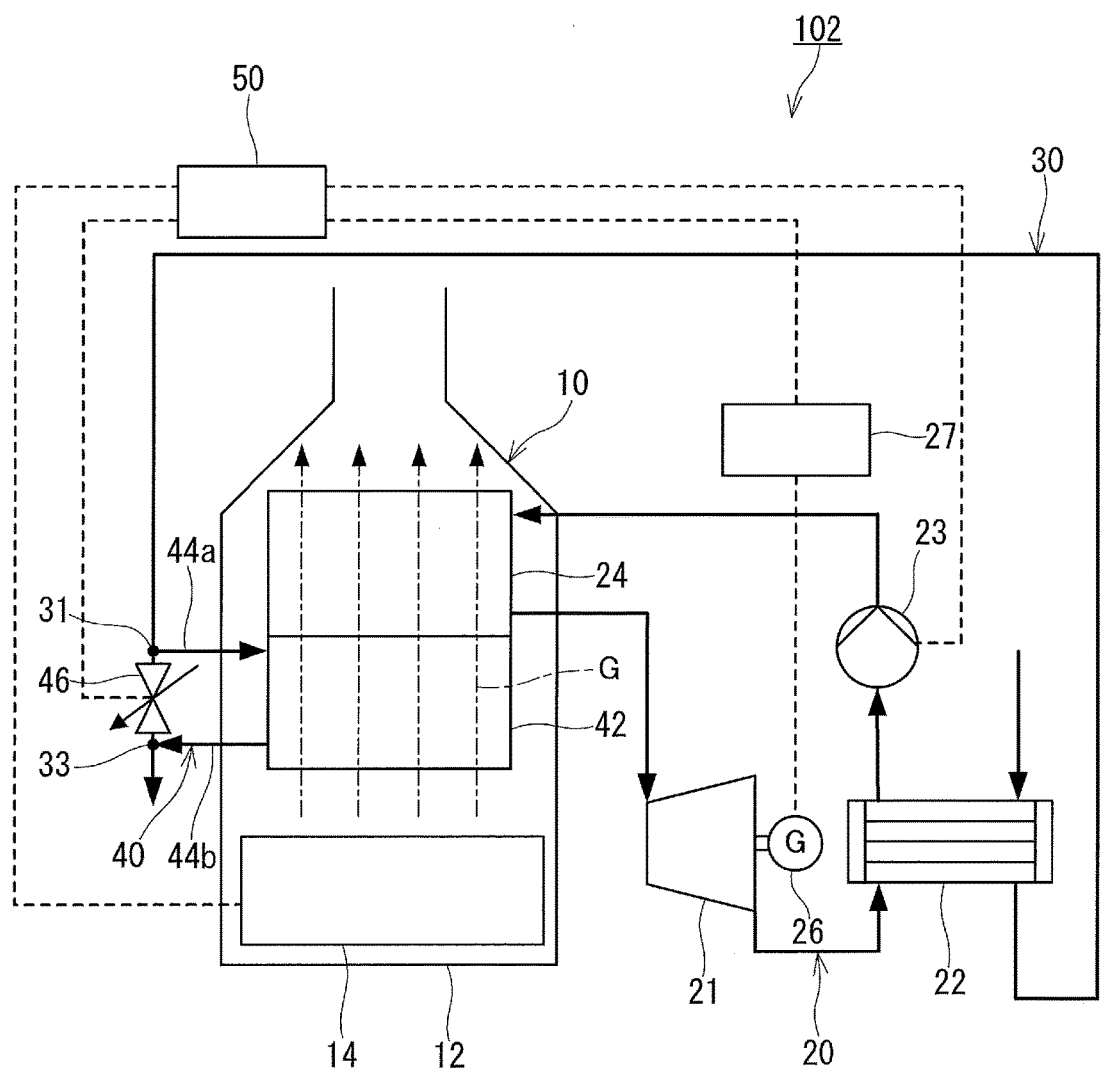
FIG. 3 is a configuration diagram of a combined heat and power system according to a first modification.

As shown in FIG. 3, a CHP system 102 according to the first modification includes the first fluid circuit 30 and the second fluid circuit 40 connected together in series. That is, the first fluid circuit 30 and the second fluid circuit 40 may be connected together in series so that the water heated through the first fluid circuit 30 is further heated through the second fluid circuit 40. In this case, higher-temperature hot water can be produced.

Also in the present modification, the second fluid circuit 40 is composed of the flow path 44a, the second heat exchanger 42, and the flow path 44b. The flow path 44a branches from the first fluid circuit 30 at a branch point 31, and is connected to the inlet of the second heat exchanger 42. The flow path 44b is connected to the outlet of the second heat exchanger 42, and joins to the first fluid circuit 30 at a junction point 33. In the first fluid circuit 30, the flow rate regulator 46 is disposed between the branch point 31 and the junction point 33. With such a configuration, not only can all of the water heated in the first fluid circuit 30 be further heated in the second heat exchanger 42, but also only a portion of the water heated in the first fluid circuit 30 can be further heated in the second heat exchanger 42. The pressure loss of water in the second heat exchanger 42 is relatively large; therefore, when the flow rate regulator 46 is fully opened, a large portion of the water bypasses the second heat exchanger 42, and only a small amount of water flows through the second heat exchanger 42. In this manner, the ratio of the amount of water bypassing the second heat exchanger 42 to the amount of water flowing through the second heat exchanger 42 can be adjusted by the flow rate regulator 46. Therefore, the electrical output and the thermal output can be freely and finely adjusted on demand. In addition, by feeding an appropriate amount of the water (for example, all of the water) to the second heat exchanger 42 when the Rankine cycle apparatus 20 is not in operation, defects such as thermal damage to the evaporator 24 and excessive increase in the internal pressure of the Rankine cycle apparatus 20 can be reliably prevented. An on-off valve may be used instead of the flow rate regulator 46. This applies also to the other modifications.

(Second Modification)

Figure 4:
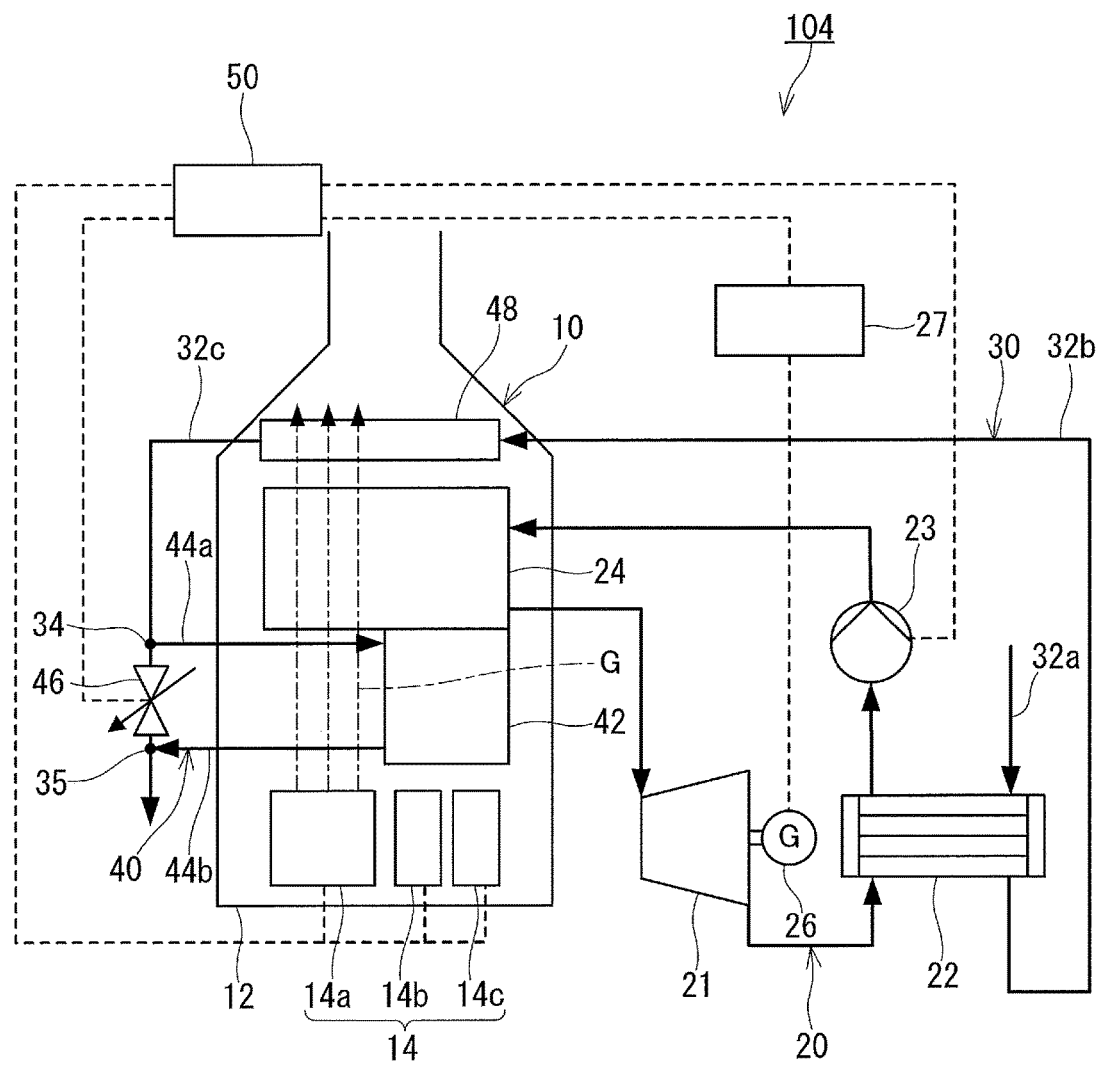
FIG. 4 is a configuration diagram of a combined heat and power system according to a second modification.

As shown in FIG. 4, a CHP system 104 according to the second modification has, as the combustor 14, a plurality of discrete combustors 14a, 14b, and 14c capable of producing flame and combustion gas independently of each other. The positional relationship between the second heat exchanger 42 and the plurality of discrete combustors 14a, 14b, and 14c is determined so that the combustion gas produced in at least one of the discrete combustors, i.e., the discrete combustor 14a, flows without passing through the second heat exchanger 42. Specifically, the second heat exchanger 42 is situated directly above the discrete combustors 14b and 14c of the plurality of discrete combustors 14a, 14b, and 14c, and is not situated directly above the other discrete combustor 14a. By contrast, the evaporator 24 is situated directly above the plurality of discrete combustors 14a, 14b, and 14c. In other words, when an image of the second heat exchanger 42 is orthogonally projected onto the combustor 14, the projected image of the second heat exchanger 42 overlaps only the discrete combustors 14b and 14c. When an image of the evaporator 24 is orthogonally projected onto the combustor 14, the projected image of the evaporator 24 overlaps all of the discrete combustors 14a, 14b, and 14c. The combustion gas G produced in the discrete combustor 14a travels toward the evaporator 24 substantially without passing through the second heat exchanger 42. When the amount and temperature of hot water produced in the first fluid circuit 30 are sufficient so that there is no need to additionally heat the hot water in the second fluid circuit 40, the combustion gas G can be delivered directly to the evaporator 24. Thus, defects such as thermal damage to the second heat exchanger 42 can be prevented. Furthermore, since the combustion gas G maintaining a high temperature reaches the evaporator 24, the efficiency of electricity generation by the Rankine cycle apparatus 20 can be improved.

The scales (the heating powers) of the discrete combustors 14a, 14b, and 14c are not particularly limited. For example, the heating power of the discrete combustor 14a may be relatively low, while the total heating power of the discrete combustors 14b and 14c may be relatively high. With such a configuration, the Rankine cycle apparatus 20 can be endowed with sufficient capacity to generate electricity. Conversely, the heating power of the discrete combustor 14a may be relatively high, while the total heating power of the discrete combustors 14b and 14c may be relatively low. In this case, even when the operation of the Rankine cycle apparatus 20 is stopped, a sufficient amount of hot water can be supplied. That is, sufficient space heating performance is exhibited.

The CHP system 104 further includes a third heat exchanger 48. The third heat exchanger 48 is disposed inside the boiler 10 so as to be located farther from the combustor 14 than is the evaporator 24. The third heat exchanger 48 is, for example, a fin tube heat exchanger. The third heat exchanger 48 is not in direct contact with the evaporator 24, and a gap of appropriate width is provided between the third heat exchanger 48 and the evaporator 24. In the present embodiment, the same heat medium as that flowing through the second heat exchanger 42, i.e., water, flows through the third heat exchanger 48. In the third heat exchanger 48, the thermal energy produced in the combustor 14 is transferred to water. With the use of the third heat exchanger 48, that remaining portion of the thermal energy produced in the combustor 14 which has not been absorbed in the evaporator 24 and the second heat exchanger 42 can be recovered. Consequently, the efficiency of use of the thermal energy produced in the combustor 14 is improved.

In the present modification, the third heat exchanger 48 is provided in the first fluid circuit 30 so as to further heat the water heated in the condenser 22 of the Rankine cycle apparatus 20. To be specific, the first fluid circuit 30 is composed of flow paths 32a to 32c and the third heat exchanger 48. The water outlet of the condenser 22 and the inlet of the third heat exchanger 48 are connected by the flow path 32b. Therefore, the water flowing in the first fluid circuit 30 is heated in the condenser 22 by the working fluid of the Rankine cycle apparatus 20, and then further heated by the residual heat of the combustion gas G in the third heat exchanger 48. The flow path 32c is connected to the outlet of the third heat exchanger 48. Hot water can be supplied to the outside through the flow path 32c.

Additionally, in the present modification, the third heat exchanger 48 is connected to the second heat exchanger 42 so that the water having passed through the third heat exchanger 48 flows into the second heat exchanger 42. With such a configuration, water with a relatively low temperature flows through the third heat exchanger 48, while water with a relatively high temperature flows through the second heat exchanger 42. Therefore, a larger amount of thermal energy can be absorbed in the second heat exchanger 42 and the third heat exchanger 48. Consequently, the efficiency of use of the thermal energy produced in the combustor 14 is improved.

More specifically, the flow path 44a of the second fluid circuit 40 branches from the flow path 32c of the first fluid circuit 30. That is, the first fluid circuit 30 and the second fluid circuit 40 are connected in series. In addition, the outlet of the second heat exchanger 42 and the flow path 32c are connected by the flow path 44b at a junction point 35 located downstream of a branch point 34 between the flow path 32c and the flow path 44a. The hot water flowing from the second heat exchanger 42 is returned to the flow path 32c of the first fluid circuit 30 through the flow path 44b. The water heated in the condenser 22 is further heated in the third heat exchanger 48 and the second heat exchanger 42. Consequently, the efficiency of use of the thermal energy produced in the combustor 14 is further improved.

In the first fluid circuit 30 (flow path 32c), the flow rate regulator 46 is disposed between the branch point 34 and the junction point 35. By control of the flow rate regulator 46, not only can all of the water heated in the first fluid circuit 30 be further heated in the second heat exchanger 42, but also only a portion of the water heated in the first fluid circuit 30 can be further heated in the second heat exchanger 42. The pressure loss of water in the second heat exchanger 42 is relatively large; therefore, when the flow rate regulator 46 is fully opened, a large portion of the water bypasses the second heat exchanger 42, and only a small amount of water flows through the second heat exchanger 42. In this manner, the ratio of the amount of water bypassing the second heat exchanger 42 to the amount of water flowing through the second heat exchanger 42 can be adjusted by the flow rate regulator 46. Therefore, the electrical output and the thermal output can be freely and finely adjusted on demand. Furthermore, by feeding an appropriate amount of water to the second heat exchanger 42 when the Rankine cycle apparatus 20 is not in operation, defects such as thermal damage to the evaporator 24 and excessive increase in the internal pressure of the Rankine cycle apparatus 20 can be reliably prevented.

The third heat exchanger 48 may be provided independently of the first fluid circuit 30 and the second fluid circuit 40. In other words, the third heat exchanger 48 may be a heat exchanger capable of heating a heat medium different from the heat medium to be heated in the first fluid circuit 30 and the second fluid circuit 40. The third heat exchanger 48 may be provided in the CHP systems 100 and 102 previously described.

The discrete combustors 14a, 14b, and 14c may each be operated alone, or two or more combustors selected from the discrete combustors 14a, 14b, and 14c may be operated simultaneously. For example, when the operation of the discrete combustors 14b and 14c is stopped and the discrete combustor 14a is operated alone, substantially only the evaporator 24 receives thermal energy, and electricity and hot water are produced by the Rankine cycle apparatus 20. When the discrete combustor 14b or 14c is operated alone, substantially only the second heat exchanger 42 receives thermal energy, and only hot water is produced. That is, by controlling the combustor 14 on the demand for hot water and the demand for electricity, it is possible to adjust the electrical output and thermal output freely, thereby improving the convenience for users.

(Third Modification)

Figure 5A:
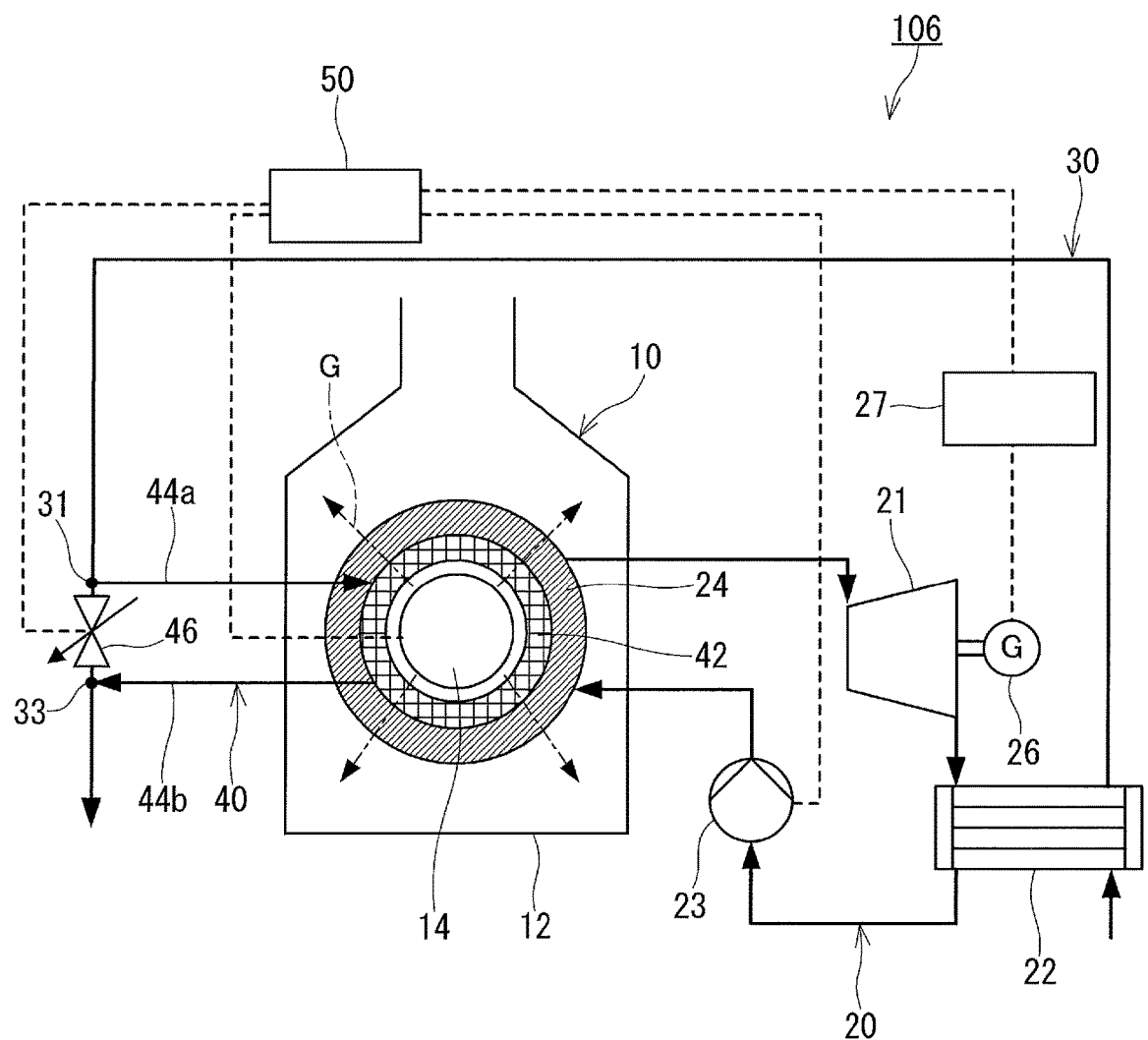
FIG. 5A is a configuration diagram of a combined heat and power system according to a third modification.

As shown in FIG. 5A, a CHP system 106 according to the third modification includes a cylindrical combustor as the combustor 14. Flame and combustion gas are produced at the surface of the cylindrical combustor 14. A heat exchanger (the second heat exchanger 42 in the present modification) is disposed around the combustor 14 so as to surround the combustor 14. The combustion gas G flows radially, passes through the heat exchanger, and is discharged to the outside. During this process, the water flowing in the heat exchanger receives thermal energy from the flame and the combustion gas to become hot water. Boilers having such a structure are in widespread use mainly in Europe, and are provided, for example, by VIESSMANN in Germany.

Figure 5B:
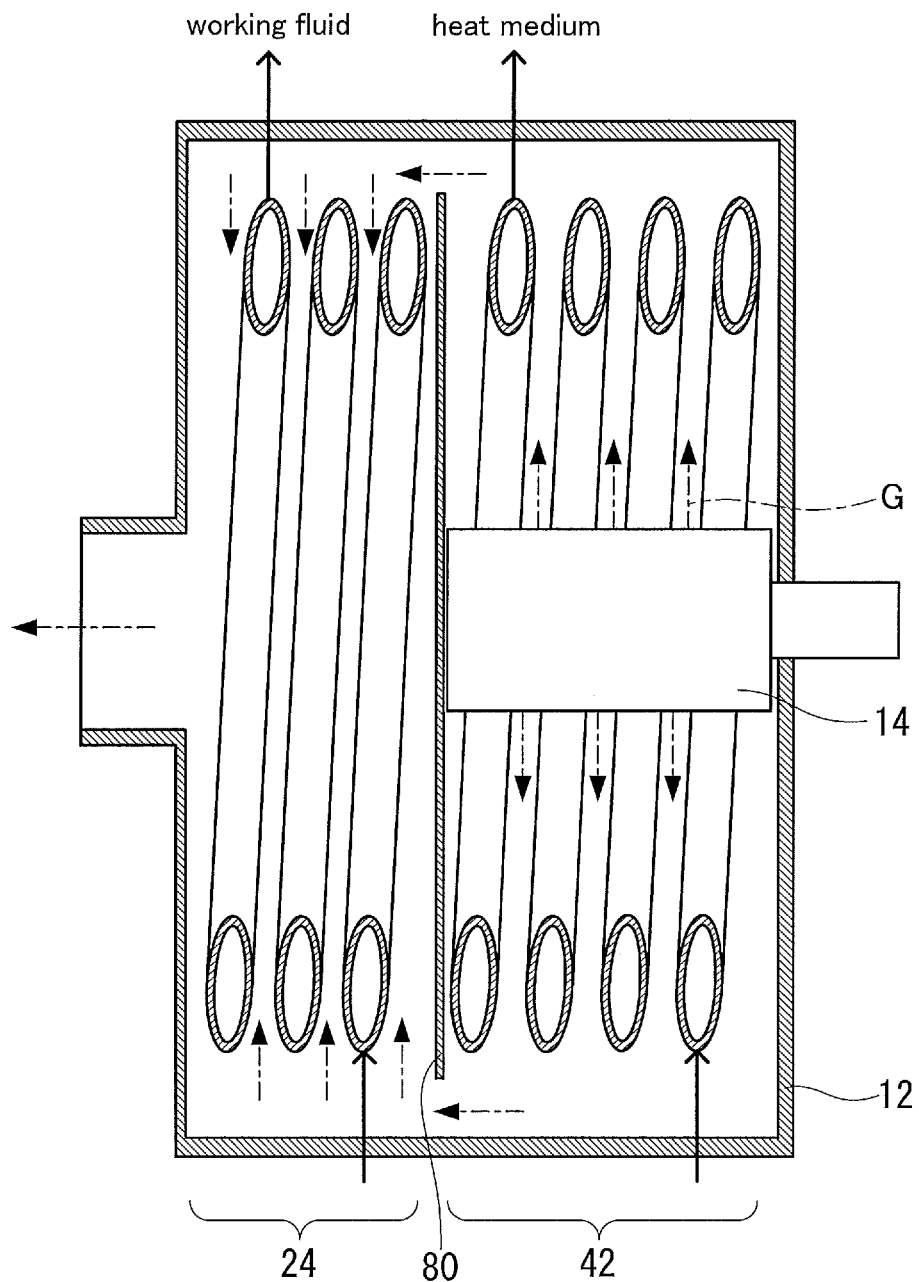
FIG. 5B is a schematic cross-sectional view showing the positional relationship among a combustor, a first heat exchanger (evaporator), and a second heat exchanger in the combined heat and power system shown in FIG. 5A.

As shown in FIG. 5B, a heat transfer tube as the second heat exchanger 42 is disposed around the cylindrical combustor 14. The heat transfer tube as the second heat exchanger 42 is formed in a helical shape, and surrounds the combustor 14 at a slight distance from the combustor 14. Additionally, a heat transfer tube as the evaporator 24 is located farther from the combustor 14 than is the second heat exchanger 42. The heat transfer tube as the evaporator 24 is also formed in a helical shape. In FIG. 5B, the second heat exchanger 42 and the evaporator 24 are not in direct contact with each other. However, a portion of the heat transfer tube as the second heat exchanger 42 may be in direct contact with a portion of the heat transfer tube as the evaporator 24. In this case, heat transfer from the evaporator 24 to the second heat exchanger 42 is made possible. In the present modification, the second heat exchanger 42 faces the cylindrical outer circumference of the combustor 14, whereas the evaporator 24 does not face the cylindrical outer circumference of the combustor 14. A partition plate 80 is disposed on the end face of the combustor 14. The partition plate 80 extends toward the inner circumference of the second heat exchanger 42, and limits the flow path of the combustion gas G. The partition plate 80 may be in contact with the second heat exchanger 42.

The combustion gas G is blown out radially outward from the combustor 14, flows through the space around the second heat exchanger 42 and the space around the evaporator 24 in this order, and then travels in the internal space of the combustion chamber 12 toward the exhaust port. The CHP system 106 including the combustor 14 having such a structure can also exert the same function and provide the same effect as the CHP system 100 described with reference to FIG. 1. As can be seen from FIG. 5B, the concept of being "in direct contact" encompasses not only the situation where a plurality of fins is shared as in the example of FIG. 2, but also the situation where the heat transfer tube constituting the evaporator 24 and the heat transfer tube constituting the second heat exchanger 42 are in line or surface contact with each other.

Figure 5C:
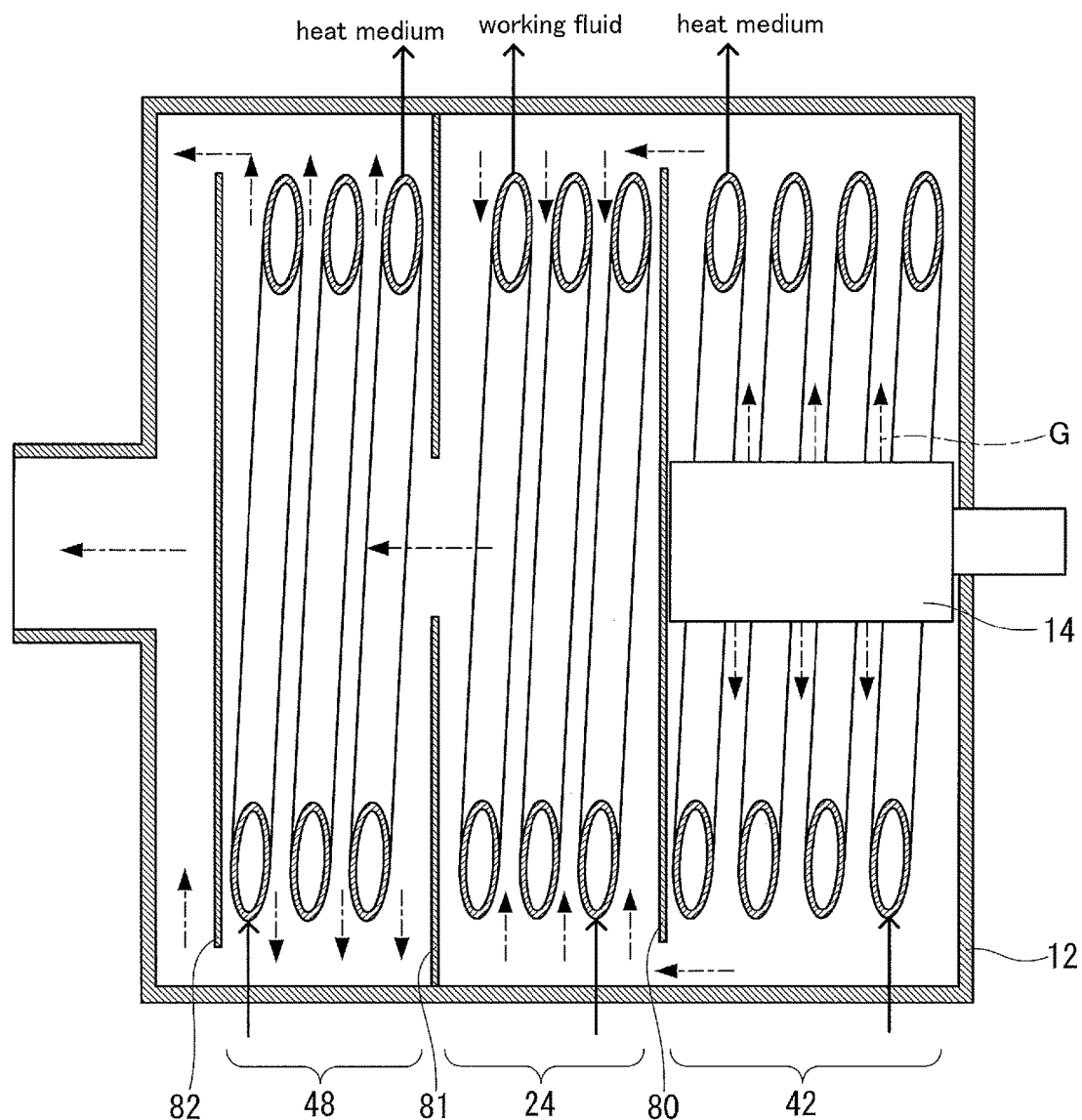
FIG. 5C is a schematic cross-sectional view showing the positional relationship among a combustor, a first heat exchanger (evaporator), a second heat exchanger, and a third heat exchanger of the second modification when the third heat exchanger is added to the combined heat and power system shown in FIG. 5A.

Also, the third heat exchanger 48 described with reference to FIG. 4 may be provided in the CHP system 106 shown in FIG. 5A. In this case, as shown in FIG. 5C, a heat transfer tube as the third heat exchanger 48 is disposed inside the combustion chamber 12 so as to be located farther from the combustor 14 than is the evaporator 24. The heat transfer tube as the third heat exchanger 48 is also formed in a helical shape. A partition plate 81 is additionally provided so as to partially separate the space around the evaporator 24 from the space around the third heat exchanger 48. A partition plate 82 is additionally provided so that the combustion gas G flows radially outward from the vicinity of the center of the helically-shaped third heat exchanger 48. The combustion gas G is blown out radially outward from the combustor 14, and flows through the space around the second heat exchanger 42, the space around the evaporator 24, and the space around the third heat exchanger 48 in this order. The water heated in the third heat exchanger 48 can be further heated in the second heat exchanger 42.

Also in the CHP system 106 of the present modification, the first fluid circuit 30 is, as shown in FIG. 5A, connected to the second fluid circuit 40 in series as in the CHP system 102 of the first modification. Also in the present modification, by control of the flow rate regulator 46, not only can all of the water heated in the first fluid circuit 30 be further heated in the second heat exchanger 42, but also only a portion of the water heated in the first fluid circuit 30 can be further heated in the second heat exchanger 42. Therefore, higher-temperature hot water can be produced as in the CHP system 102 of the first modification. The electrical output and the thermal output can be freely and finely adjusted on demand. Furthermore, by feeding an appropriate amount of water to the second heat exchanger 42 when the Rankine cycle apparatus 20 is not in operation, defects such as thermal damage to the evaporator 24 and excessive increase in the internal pressure of the Rankine cycle apparatus 20 can be reliably prevented.

(Fourth Modification)

Figure 6:
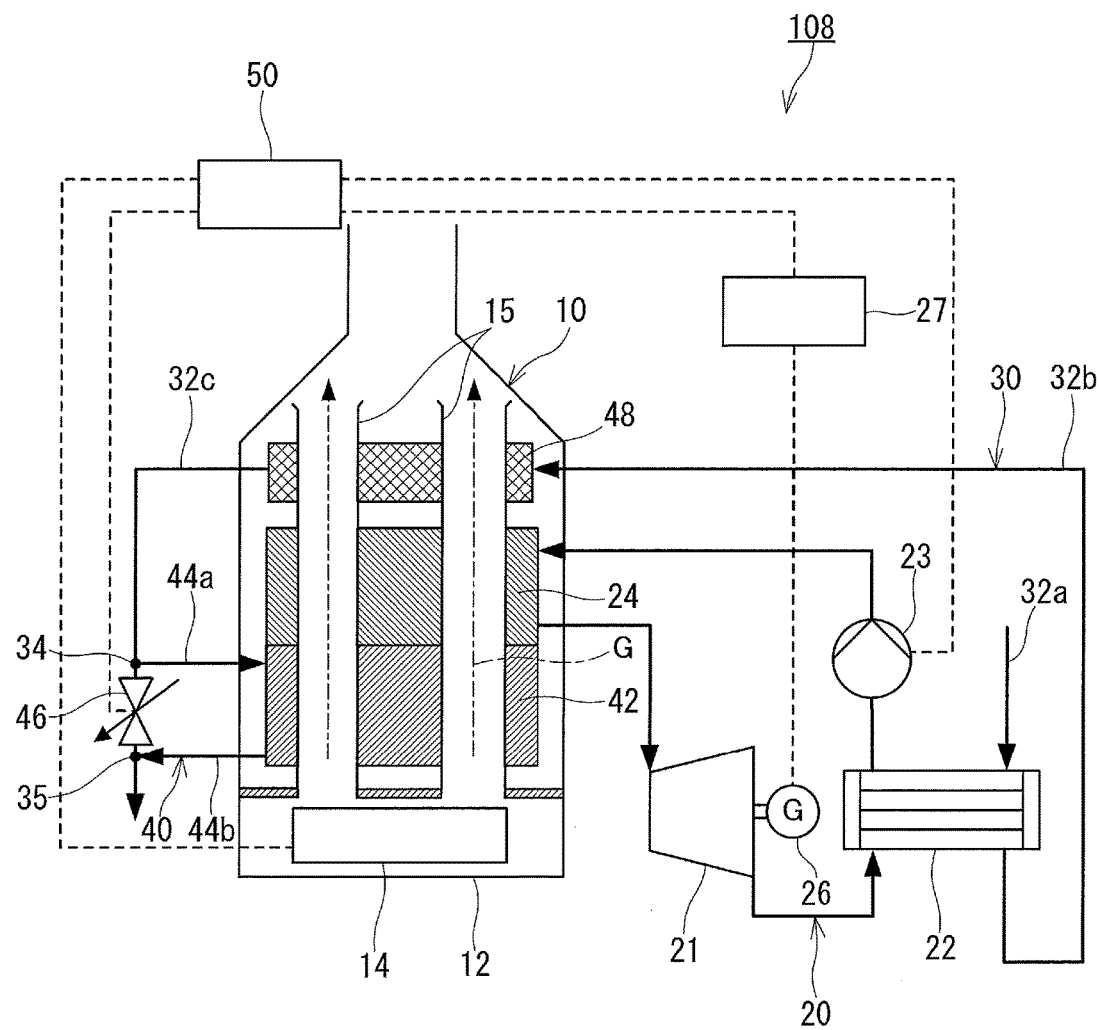
FIG. 6 is a configuration diagram of a combined heat and power system according to a fourth modification.

As shown in FIG. 6, a CHP system 108 according to the fourth modification includes, as the boiler 10, a pellet boiler instead of a gas boiler. When the boiler 10 is a pellet boiler, the combustor 14 produces high-temperature combustion gas by combusting a solid fuel, such as wood pellet, coal, and biomass, in the pellet boiler.

In the present modification, the boiler 10 includes a flue(s) 15 disposed directly above the combustor 14. The flue is a path of the combustion gas G, and extends from the combustor 14 toward the exhaust port. The second heat exchanger 42, the evaporator 24, and the third heat exchanger 48 are arranged in order of increasing distance from the combustor 14. The second heat exchanger 42, the evaporator 24, and the third heat exchanger 48 can each be constituted by a heat transfer tube wound around the flue 15. The heat transfer tube as the second heat exchanger 42 is in direct contact with the heat transfer tube as the evaporator 24. Therefore, the CHP system 108 according to the present modification can also exert the same function and provide the same effect as the CHP system 100 described with reference to FIG. 1.

Also in the CHP system 108 of the present modification, the first fluid circuit 30 is connected to the second fluid circuit 40 in series as in the CHP system 104 of the second modification or the CHP system 106 of the third modification. The configurations of the first fluid circuit 30 and the second fluid circuit 40 in the present modification are the same as those of the first fluid circuit 30 and the second fluid circuit 40 in the second modification or the third modification. Therefore, also for the first fluid circuit 30 and the second fluid circuit 40 in the present modification, the same effects as those in the second modification and the third modification can be obtained (Fifth Modification)

Figure 7:
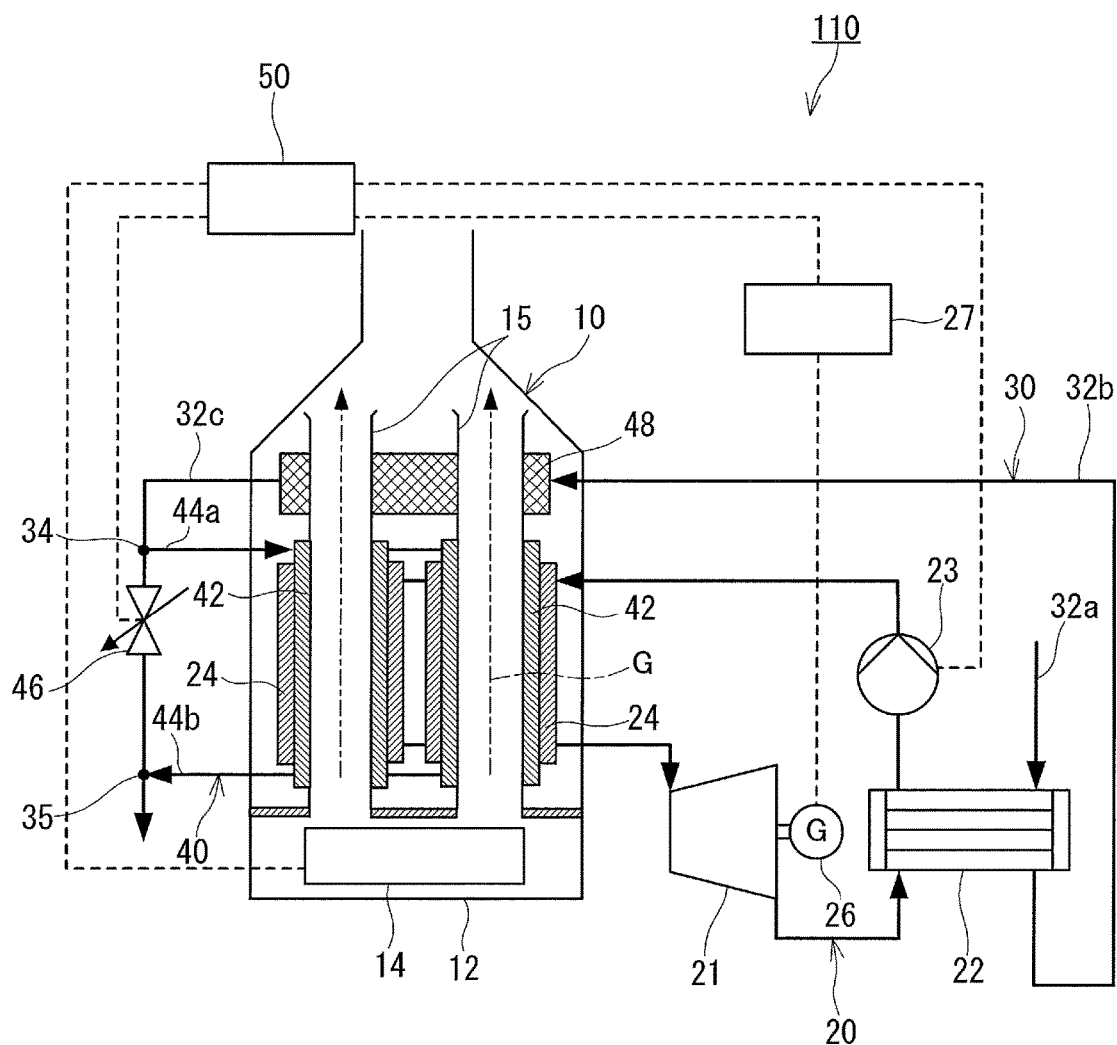
FIG. 7 is a configuration diagram of a combined heat and power system according to a fifth modification.

As shown in FIG. 7, a CHP system 110 according to the fifth modification also includes a pellet boiler as the boiler 10. The difference between the present modification and the fourth modification lies in the positional relationship among the flue 15, the evaporator 24, and the second heat exchanger 42. In the present modification, the second heat exchanger 42 is located relatively close to the flue 15, and the evaporator 24 is located relatively far from the flue 15. A heat transfer tube as the second heat exchanger 42 is disposed around the flue 15. Specifically, the heat transfer tube as the second heat exchanger 42 is wound on the flue 15. A heat transfer tube as the evaporator 24 is disposed outwardly of the second heat exchanger 42 in the radial direction of the flue 15. Specifically, the heat transfer tube as the evaporator 24 is wound on the second heat exchanger 42. The heat transfer tube as the second heat exchanger 42 and the heat transfer tube as the evaporator 24 are in contact with each other in the radial direction of the flue 15. The heat transfer tube as the second heat exchanger 42 and the heat transfer tube as the evaporator 24 each have a helical shape and extend vertically along the flue 15. A pair of the evaporator 24 and the second heat exchanger 42 is disposed around each of the plurality of flues 15. In order that the flow direction of the combustion gas G in the flue 15 and the flow direction of the heat medium in the second heat exchanger 42 may be opposite to each other, the inlet of the second heat exchanger 42 is formed so as to be located relatively far from the combustor 14 (on the downstream side of the flue 15), and the outlet of the second heat exchanger 42 is formed so as to be located relatively close to the combustor 14 (on the upstream side of the flue 15). Thus, efficient heat exchange takes place between the combustion gas G flowing in the flue 15 and the heating medium flowing in the second heat exchanger 42. This applies also to the evaporator 24.

When the boiler 10 is a pellet boiler, not only the distance from the combustor 14 but also the distance from the flue 15 acts as a factor influencing the amount of heat input to the evaporator 24 and the second heat exchanger 42. Assuming the flue 15 as a heat source, the second heat exchanger 42 is located closer to the heat source than is the evaporator 24. Also in the present modification, the same effects as those of the CHP systems 100 to 108 previously described can be obtained.

(Other Modifications)

It is not essential that the evaporator 24 be in direct contact with the second heat exchanger 42. The evaporator 24 may be spaced apart from the second heat exchanger 42. For example, a gap as formed between the evaporator 24 and the third heat exchanger 48 may be provided between the evaporator 24 and the second heat exchanger 42. Even when the evaporator 24 is in contact with the second heat exchanger 42, it is not essential that the contact of the evaporator 24 with the second heat exchanger 42 be directly made. The evaporator 24 may be in indirect contact with the second heat exchanger 42 via a thermally-conductive member. The thermally-conductive member is a member that makes thermal connection between the evaporator 24 and the second heat exchanger 42. An example of the thermally-conductive member is a heat pipe.

Figure 8A:
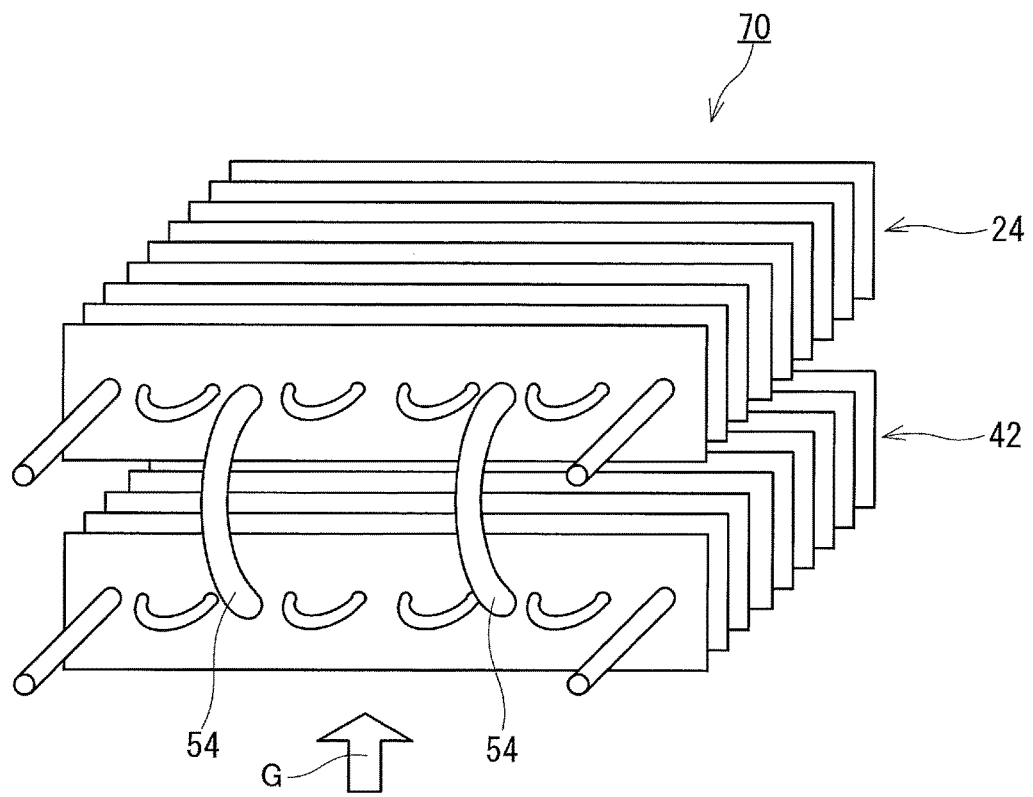
FIG. 8A is a perspective view of a heat exchange unit according to a modification.

A heat exchange unit 70 shown in FIG. 8A is formed of the evaporator 24, the second heat exchanger 42, and a heat pipe 54. In the heat exchange unit 70, the evaporator 24 is not in direct contact with the second heat exchanger 42. The evaporator 24 is disposed directly above the second heat exchanger 42. The evaporator 24 and the second heat exchanger 42 face each other. A gap of certain width is provided between the evaporator 24 and the second heat exchanger 42. The heat pipe 54 that allows the evaporator 24 and the second heat exchanger 42 to be in indirect contact with each other is provided so that heat of the evaporator 24 is sufficiently transferred to the second heat exchanger 42. Such a heat pipe 54 is often used to facilitate heat transfer from one object to another. The heat pipe 54 can be composed of a pipe made of a material having high thermal conductivity and a volatile medium enclosed inside the pipe. By heating one end of the pipe and cooling the other end, the cycle of evaporation and condensation of the volatile medium is made to occur in the pipe. As a result, heat transfers from the one end to the other end of the pipe.

Figure 8B:
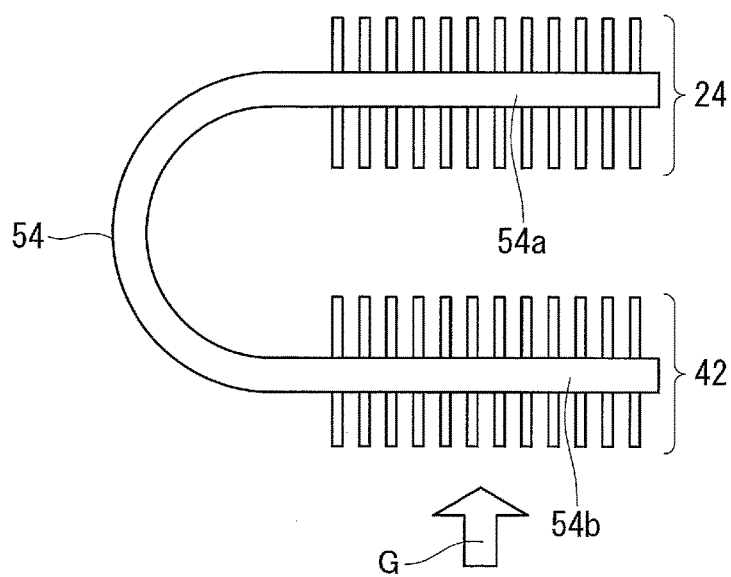
FIG. 8B is a schematic cross-sectional view of the heat exchange unit shown in FIG. 8A.

As shown in FIG. 8B, the heat pipe 54 has a heat absorption portion 54a and a heat release portion 54b. The heat absorption portion 54a and the heat release portion 54b are in direct contact with the evaporator 24 and the second heat exchanger 42, respectively. Specifically, the heat absorption portion 54a pierces through the fins of the evaporator 24, and thus the heat absorption portion 54a is fixed to the evaporator 24. The heat release portion 54b pierces through the fins of the second heat exchanger 42, and thus the heat release portion 54b is fixed to the second heat exchanger 42. With such a configuration, the heat transfer from the evaporator 24 to the second heat exchanger 42 can be facilitated.

Figure 8C:
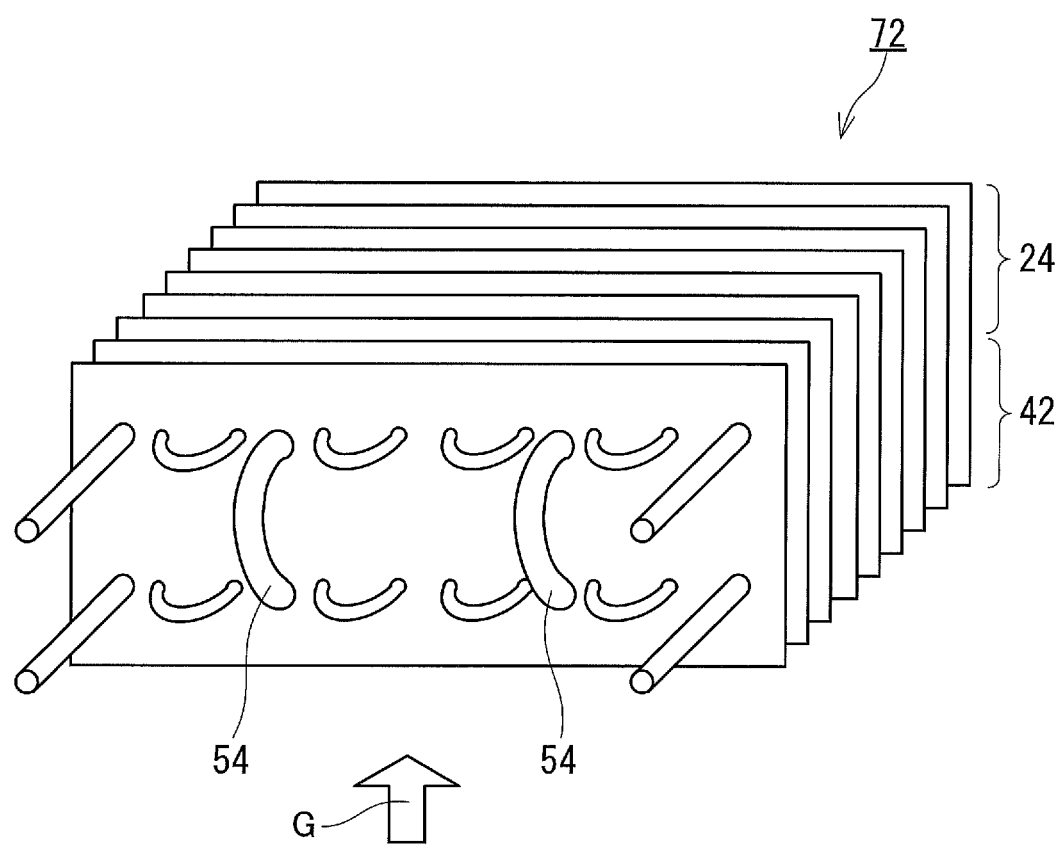
FIG. 8C is a perspective view of a heat exchange unit according to another modification.

Obviously, the heat pipe 54 can be used also when, as in a heat exchange unit 72 shown in FIG. 8C, the evaporator 24 is in direct contact with the second heat exchanger 42.

INDUSTRIAL APPLICABILITY

The CHP systems disclosed in the present description can heat a heat medium such as water even when the Rankine cycle apparatus is not in operation. Such CHP systems are particularly suitable for use in cold regions in which it is customary to produce hot water for indoor heating by a boiler. That is, the techniques disclosed in the present description can enhance the capacity of CHP systems to supply hot water, and also make it possible to continue indoor heating even when the Rankine cycle apparatus gets out of order for some reason.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A combined heat and power system comprising:
   a heat source;
   a Rankine cycle apparatus comprising, as an evaporator for heating a working fluid, a first heat exchanger that absorbs thermal energy produced in the heat source;
   a second heat exchanger that is a heat exchanger for heating a heat medium different from the working fluid of the Rankine cycle apparatus, that is located closer to the heat source than is the first heat exchanger, and that absorbs thermal energy produced in the heat source and transfers the thermal energy to the heat medium; and
   a fluid circuit that includes the second heat exchanger, wherein
   the working fluid is an organic working fluid,
   the heat medium is in a single-phase state selected from a gas-phase state and a liquid-phase state in the second heat exchanger,
   no heat exchanger used to heat the working fluid is provided upstream of the second heat exchanger in a flow path of a medium that imparts the thermal energy to the working fluid and the heat medium, and
   the fluid circuit is not fluidly connected with the flow path of the medium that imparts the thermal energy to the working fluid and the heat medium.

2. The combined heat and power system according to claim 1, wherein the second heat exchanger is in direct contact with the first heat exchanger or in indirect contact with the first heat exchanger via a thermally-conductive member.

3. The combined heat and power system according to claim 1, wherein the heat source is a combustor that produces flame and combustion gas that serves as the medium.

4. The combined heat and power system according to claim 3, wherein the first heat exchanger and the second heat exchanger are disposed on the flow path of the combustion gas so that the combustion gas passes through the second heat exchanger and the first heat exchanger in this order.

5. The combined heat and power system according to claim 1, further comprising:
   a flow rate regulator, wherein
   the fluid circuit includes a flow path that feeds the heat medium to the second heat exchanger, and
   the flow rate regulator is disposed in the flow path.

6. The combined heat and power system according to claim 5, wherein
   the Rankine cycle apparatus comprises a detector that detects an amount of generated electricity, and
   the combined heat and power system further comprises a controller that controls the flow rate regulator based on the amount of generated electricity detected by the detector.

7. The combined heat and power system according to claim 1, wherein the combined heat and power system is capable of heating the heat medium by feeding the heat medium to the second heat exchanger when the Rankine cycle apparatus is not generating electricity.

8. The combined heat and power system according to claim 3, wherein
   the combustor comprises a plurality of discrete combustors capable of producing the flame and the combustion gas independently of each other, and
   a positional relationship between the second heat exchanger and the plurality of discrete combustors is determined so that the combustion gas produced in at least one of the discrete combustors flows without passing through the second heat exchanger.

9. The combined heat and power system according to claim 1, further comprising a third heat exchanger located farther from the heat source than is the first heat exchanger, wherein the third heat exchanger transfers thermal energy produced in the heat source to the heat medium.

10. The combined heat and power system according to claim 9, wherein the third heat exchanger is connected to the second heat exchanger so that the heat medium having passed through the third heat exchanger flows into the second heat exchanger.

11. The combined heat and power system according to claim 2, wherein the thermally-conductive member is a heat pipe that allows the first heat exchanger and the second heat exchanger to be in indirect contact with each other.

12. The combined heat and power system according to claim 1, wherein the Rankine cycle apparatus is configured so that the working fluid receives the thermal energy only from a single medium.

13. The combined heat and power system according to claim 1, wherein the heat medium is water, and the fluid circuit is a circuit for producing hot water and supplying the hot water to the outside of the combined heat and power system.

14. The combined heat and power system according to claim 13, wherein the combined heat and power system is capable of supplying electricity alone to the outside of the combined heat and power system while stopping supply of the hot water.

15. The combined heat and power system according to claim 1, wherein a phase state of the medium that imparts the thermal energy to the working fluid and the heat medium is different from a phase state of the heat medium in the fluid circuit.

16. The combined heat and power system according to claim 1, wherein a phase state of the medium is a gas phase and a phase state of the heat medium is a liquid phase.

* * * * *